United States Patent [19]
Williamson

[11] Patent Number: 5,210,656
[45] Date of Patent: May 11, 1993

[54] LIGHT REFLECTING DEVICE

[76] Inventor: Stuart G. Williamson, 5 Union Place, Truro, Cornwall TR1 1EP, England

[21] Appl. No.: 794,874

[22] Filed: Nov. 19, 1991

[51] Int. Cl.$^5$ .............................................. G02B 7/18
[52] U.S. Cl. .................................. 359/855; 359/865; 359/871; 248/474
[58] Field of Search ............... 359/850, 855, 865, 871, 359/872; 248/469, 472, 474

[56] References Cited

U.S. PATENT DOCUMENTS

| | | | |
|---|---|---|---|
| 423,434 | 3/1890 | Lotto | 359/865 |
| 1,220,069 | 3/1917 | Capdevila | 298/474 |
| 3,709,585 | 1/1973 | Tsai | 359/865 |
| 4,004,850 | 1/1977 | Nelson | 248/472 |
| 4,852,986 | 8/1989 | Yu | 359/865 |

Primary Examiner—Bruce Y. Arnold
Assistant Examiner—J. P. Ryan
Attorney, Agent, or Firm—Larson and Taylor

[57] ABSTRACT

A light-reflecting device incorporates a central light-reflecting frame (10) of polygonal shape fitted with a cross bar (17) carrying at the centre a universal joint assembly (24) one element (21) of which is fixed to the cross bar (17) and the other relatively movable element (29) is formed for attachment to a supporting rod (25) and there are provided adjacent each end of the cross bar (17) a universal joint assembly (20) one element of which is fastened to the cross bar and the other relatively movable element (21) of which is attached to an edge of a respective outer light-reflecting frame (10) also of polygonal shape. In use the frames may be swung to an infinite number of positions and configurations to provide in conjunction with a given light source any desired lighting conditions. The device is also readily dismantled for easy portability.

9 Claims, 4 Drawing Sheets

LIGHT REFLECTING DEVICE

The subject of this invention is a light reflecting device particularly for photographic purposes.

Ever since the invention of the first "camera" in 1826 attempts have been made to devise better and more realistic presentations of objects and personalities. Apart from the extreme efficiency of present day camera lenses, the attention being given to the reflection or direction of light, whether artificial or from the sun is extensive.

Commerically successful photographic processes involve the use of reflective surfaces which focus light on to an object or persons to remove the "dark" shadows and provide an all round "balanced" lifelike reproduction. In many instances it is necessary to position reflectors at different locations to focus light from various angles to identify some particular aspect of a "subject". This often requires the use of a number of mountings to hold the reflector in the correct position or at the precise angle. Numbers of tripods and reflectors often present problems in themselves, since they restrict movement and delay action.

It is an object of the present invention to provide a single-mount cluster of light reflectors which can be set in numerous configurations to accept and direct light on to a subject from a wide range of chosen angles.

According to the invention a light-reflecting device incorporates several light-reflecting frames and is characterized in that a central light-reflecting frame of polygonal shape is fitted with a cross bar carrying at the centre a universal joint assembly one element of which is fixed to the cross bar and the other relatively movable element is formed for attachment to a supporting rod and there are provided adjacent each end of the cross bar a universal joint assembly one element of which is fastened to the cross bar and the other relatively movable element of which is attached to an edge of a respective outer light-reflecting frame also of polygonal shape.

At least one of the light-reflecting frames may be of the shape of a trapezium.

At least one of the light-reflecting frames may be of the shape of a rhombus.

Each universal joint assembly may be a ball and socket joint assembly.

Means may be provided for locking each universal joint assembly in a chosen orientation.

Where the light reflecting device is to be used in conjunction with a supporting tripod presenting a substantially vertical supporting rod in the form of a tube the universal joint assembly at the centre of the cross bar may present a spigot insertable into the tubular supporting rod.

Each frame may be formed of tubular members jointed to one another at their ends to form a frame. The ends of each pair of adjacent frame members may be jointed to one another by a connecting piece comprising a plug portion fitting tightly into the end of one tubular member and a screw threaded portion projecting from one end of the plug portion and passing diametrically through a hole provided in the other tubular member of the pair, a nut engaged with the screw-threaded portion holding the two members to one another.

Additional light-reflecting frames may be arranged to be attachable to the side members of the outer light-reflecting frames.

The light-reflecting frames may carry light-reflecting surfaces which are detachably attached to the frames e.g. by elasticated cord.

The reflector frames are light-weight and can be made of tubular material which can be metal or plastic and the frame can be comprised of separate side members assembled together or of members which are fixed securely to one another. Having frame members which need to be assembled will facilitate transport when such frames are of large dimensions and there is no restriction on the size to which the reflectors are made. The reflective surface is attached to the reflector frames in a number of ways as will be described subsequently, since it is necessary to stretch the reflective material until it is as taut as possible in all directions.

A specific embodiment of the invention will now be described by way of example only, with reference to the accompanying drawing in which.

Figure 1:
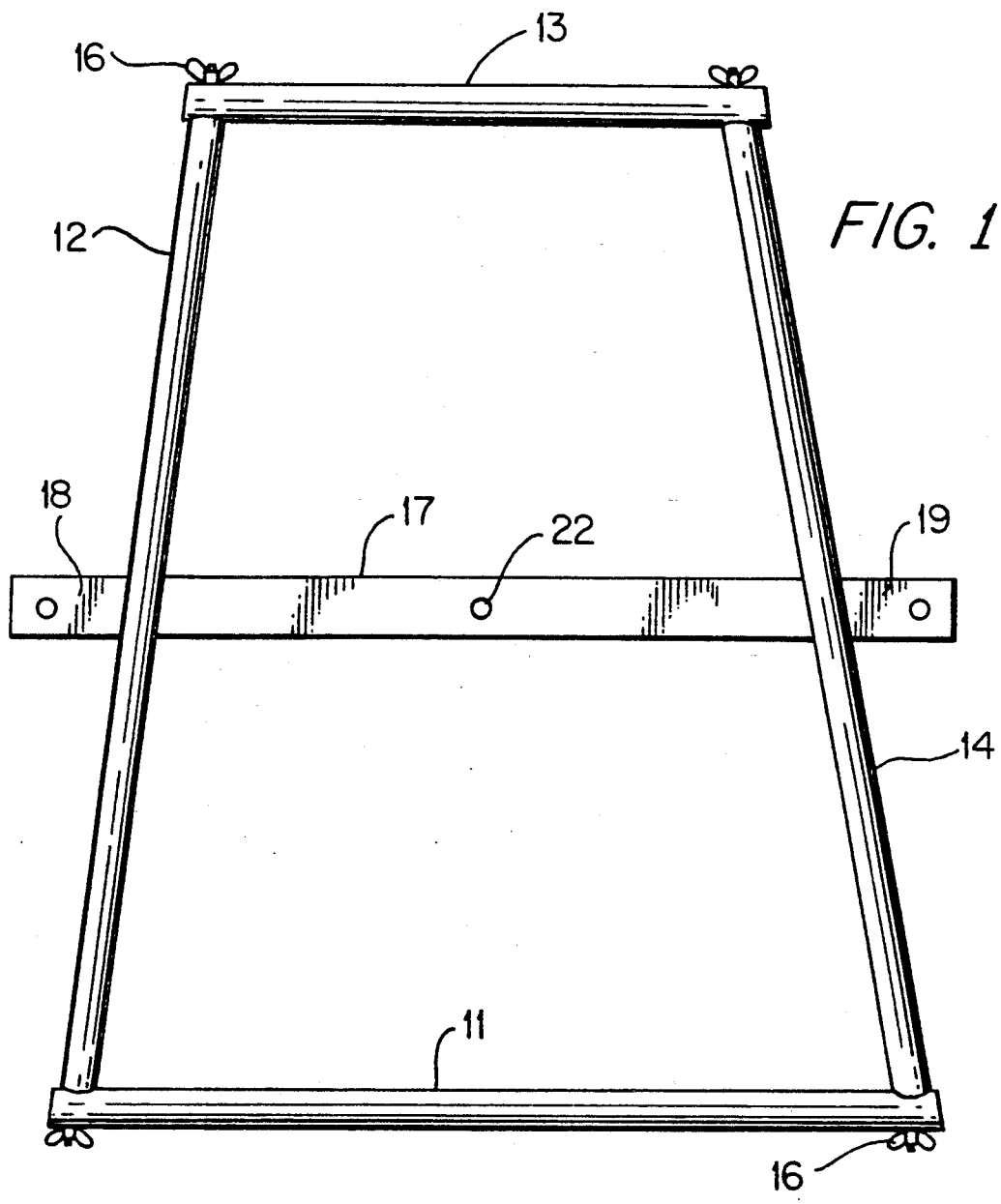
FIG. 1 shows a single reflective frame.
Figure 1A:
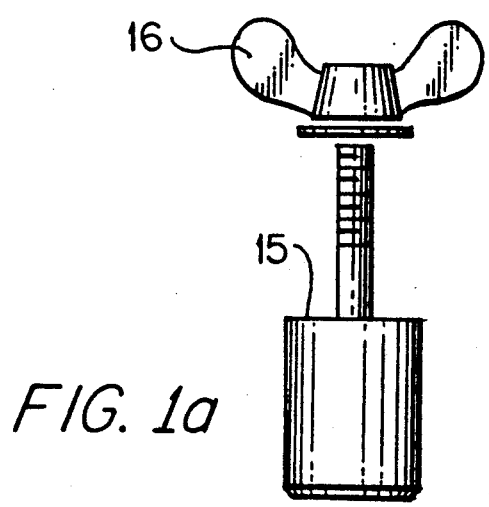
FIGS. 1a and 1b illustrate the fastening members.
Figure 1B:
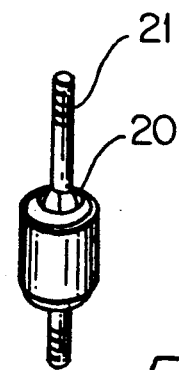

Referring to FIG. 1 the preferred shape of the reflector frame 10 is in the form of a trapezium because it has been found from experience this shape offers the best configuration for clusters of such frames 10, to obtain maximum light reflection. However other polygonal shapes such as that of a rhombus may be employed. The four side members 11, 12, 13 and 14 are preferably constructed in lightweight tubular metal but they may alternatively be constructed of rigid plastic tubular material.

Figure 2:
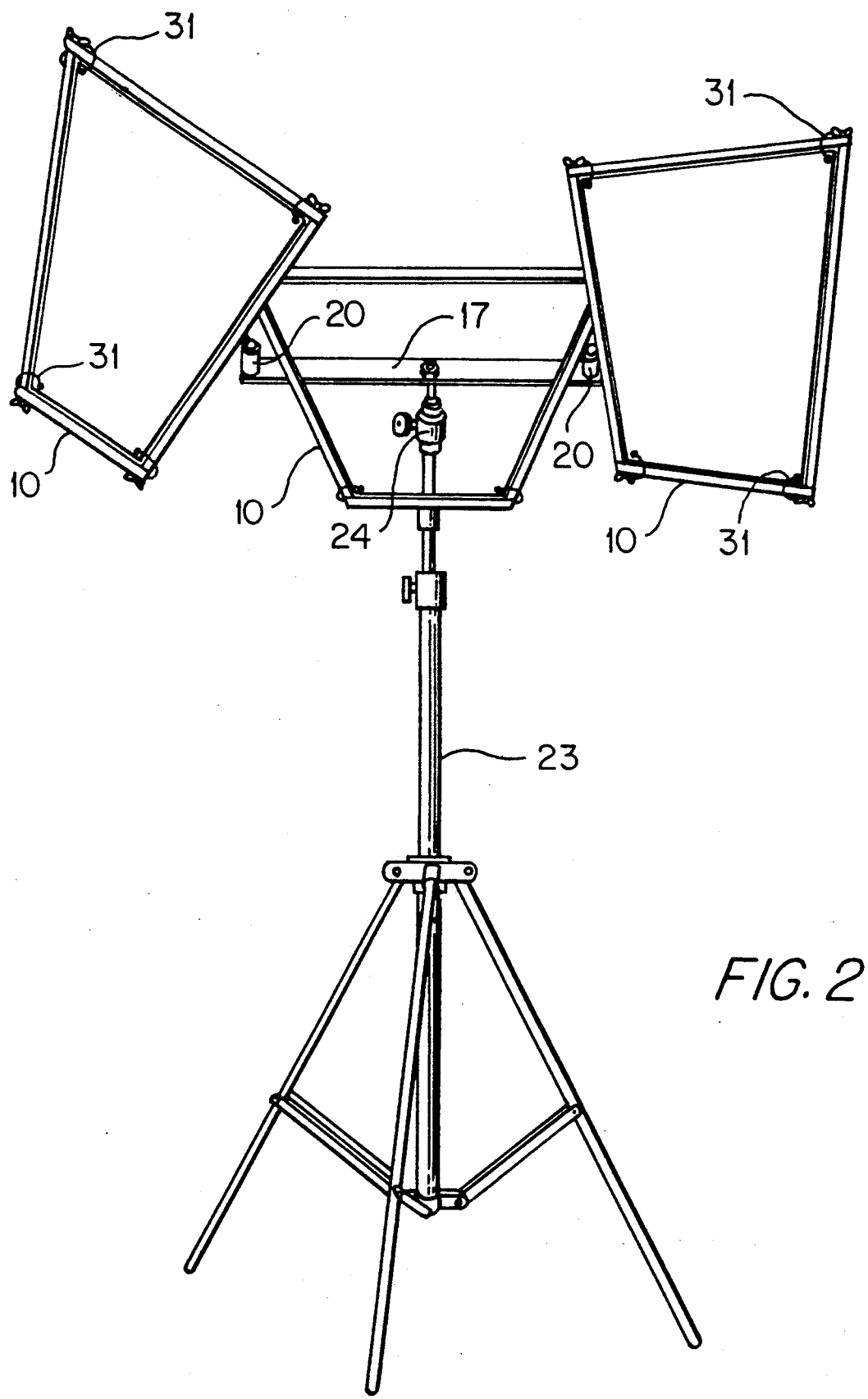
FIG. 2 illustrates a number of reflectors mounted on a single tripod.

The preferred method of engagement of the four said side members is illustrated in an enlarged cut-away view 1a and comprises an insert piece presenting a plug 15 insertable into an end of the associated tubular member or, alternatively, the extremities of each side piece may be flattened to enable a through-bolt to join the two flattened ends together and be releasably secured thereto by a wing nut 16. Whether the ends are flattened or whether an insert piece is used is immaterial to the concept of this embodiment — indeed there could be other methods of releasable securement in achieving construction of the reflector frame 10. The flat support bar 17 is provided only for the central frame 10 (see FIG. 2) and spans the space between the side members 12 and 4. The bar 17 extends beyond each side member 12 and 14 sufficiently far as at 18 and 19 to support a ball and socket joint 20 (see cut away view 1b). The support bar 17 accepts at its central position an extension 21 of the ball element of a ball and socket joint, similar to that shown in view 1b. The hole 22 is provided for that purpose and in this attachment facility the ball and socket joint is secured to the tripod mounting later to be described. The support bar 17 is fixedly secured to the side members 12 and 14 by rivets. Other reflector frames present the same shape as shown in FIG. 1 but do not require a support bar 17. Reference should now be made to FIG. 2 which illustrates a supporting tripod 23. Tripods of various designs and construction can be adapted equally effectively to provide support for the reflective frames 10. In FIG. 2 therefore any tripod which is height adjustable and whose central column can accept the ball and socket joint assembly 24, would be appropriate to this embodiment. It can be seen that the said assembly 24 fits directly on to and over the upper extremity of the telescopic height-adjusting central rod 25 of the tripod and is releasably secured there by the locking screw 26. It can be seen that the extension 21 of the ball element 24 projects upwards and is screw threaded for a short distance from its end to accept a nut 27. The extension 21 passes through the support bar 17 and is releasably secured thereto by the nut 27.

At each end of the support bar 17 and into the circular holes provided therein are fitted a ball and socket joint 20. Each of these ball and socket joints 20 has a screw-threaded extension 28 of the ball element of the joint which passes through and is releasably secured to a respective one of the side members 12 and 14 of each reflector frame 10. FIG. 2 shows the tripod 23 with a central reflector frame 10 mounted on the ball and socket joint 24 and two other reflector frames 10 fitted to the support bar 17 from the ball and socket joints 20. It can therefore be seen that each of the three reflector frames 10 can be turned into a desired position to pick up and reflect light in the desired direction. Each of the frames 10 shown in FIG. 2 is illustrated with the reflective membranes removed for purposes of pictorial clarity.

Figure 3:
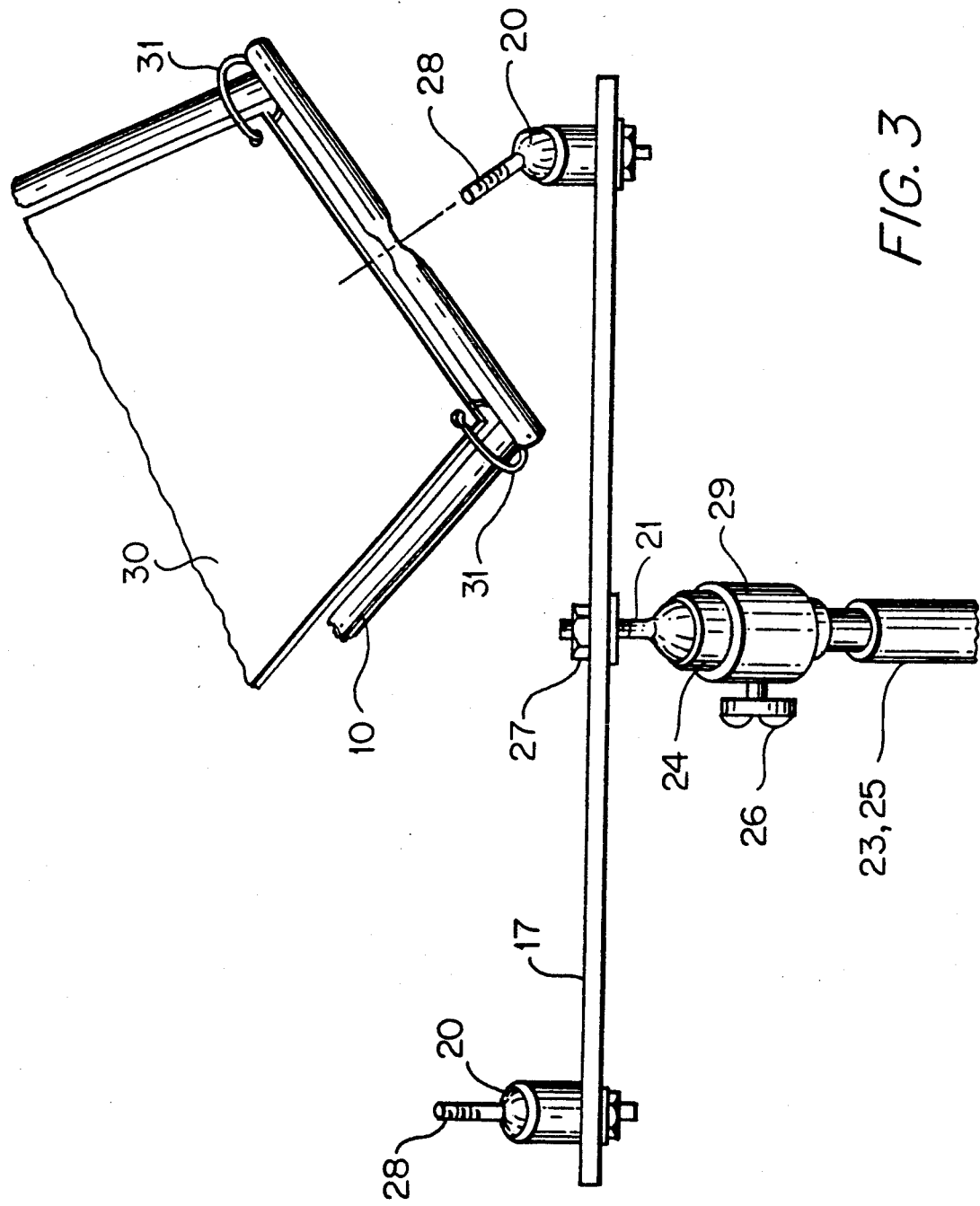
FIG. 3 shows the back of the reflector assembly.
Figure 4:
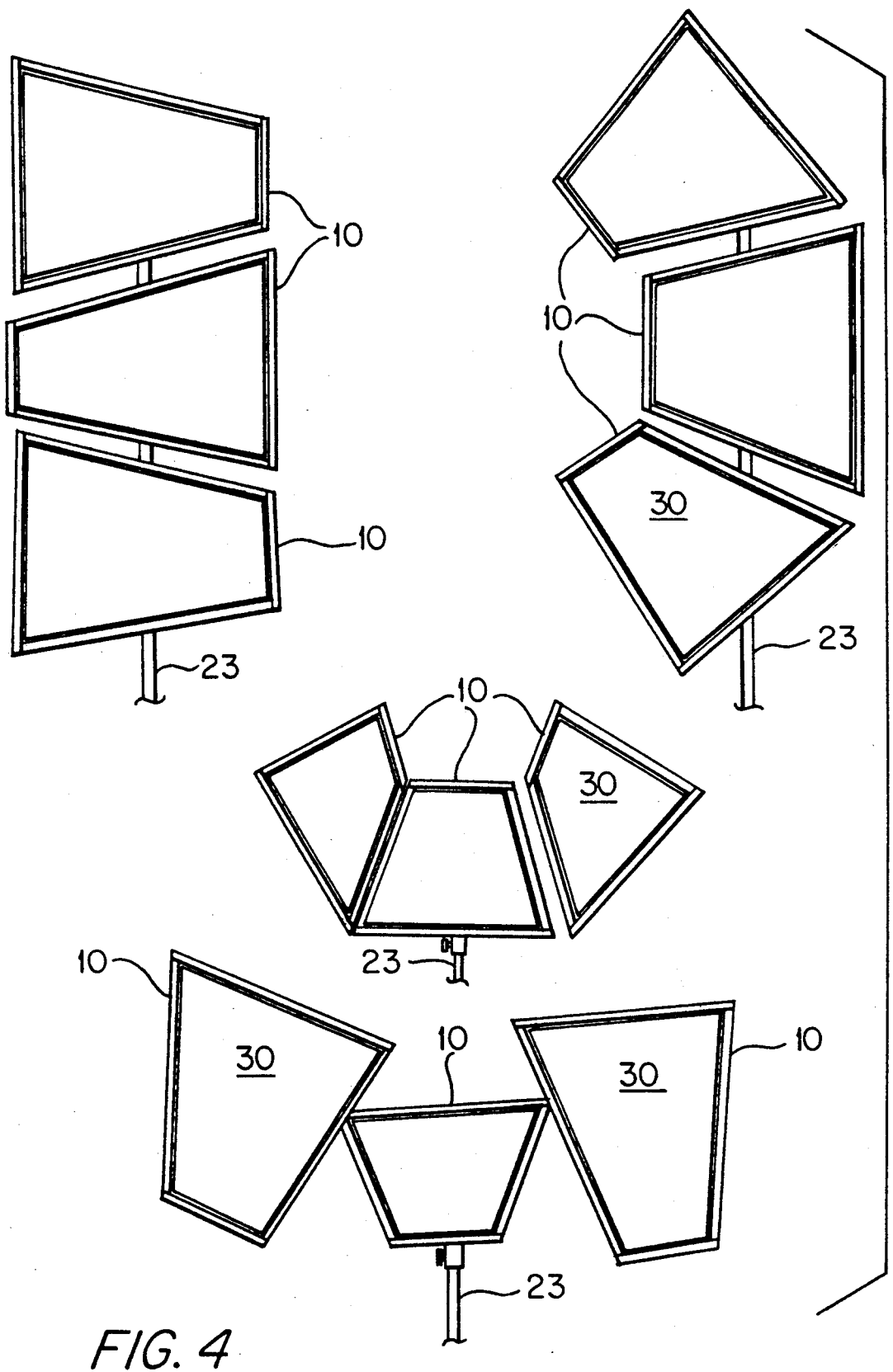
FIG. 4 illustrates some of the combinations achievable with the reflective frames.

FIG. 4 illustrates various configurations into which the reflector frames may be adjusted and temporarily fixed. FIG. 3 shows in more detail the rear side of the central or master reflector 10. This figure illustrates the upper end of the central rod 25 of a tripod with the trunk or body 29 of the ball and socket joint 24 fitting into the upper end of the central rod 25 and releasably secured thereto by the locking screw 26.

There are alternative methods of providing for releasable attachment between the body 29 of the ball and socket joint 24 and the upper end of the central rod 25 of the supporting tripod such as providing a shallow groove around the upper end of the central rod 25 into which would be tightened a threaded set screw. The method indicated in FIG. 2 is the preferred method because it offers stability to the whole reflective assembly.

The support bar 17 lies normally horizontally across the upper end of the central rod 25, but as has already been mentioned, this support bar 17 can be turned through any angle up to 360° and is only slightly restricted by the presence of the tripod 23. Reference may now be made to FIG. 4 which illustrates a number of configurations into which the reflective frames 10 may be placed on the tripod.

Very obviously the positions illustrated are but a few since the three reflective frames can be placed at any desired angle to the object being photographed and to one another to reflect light from whatever source it emanates, on to any object being photographed to provide high-light aspects or to reduce shadows as required by the photographer. The versatility of this method of supporting and adjusting light reflecting frames is well indicated by the positions shown on FIG. 4 and the ease with which the whole system may be moved, adjusted and transported will be appreciated by experienced photographers. Similarly, the dimensions of the reflective frames 10 may be altered to increase the reflective area of each frame 10, but experience has shown that the illustrated trapezium shape is the preferred one in this embodiment.

The reflective membrane 30 is stretched taut across the frames 10 in each direction by tie cords 31 which can be elasticated to apply tension to the membrane surface. Equally the ties 31 may be of string and suitable attachment to the side members 11, 12, 13 and 14 made where appropriate.

Thus it can be seen that the light-reflecting assembly of the invention describes a very flexible and effective manner of reflecting, focussing and deflecting light whether natural or artificial to aid the photographic reproduction of articles, persons, scenes, objects and features, while also enabling specific details to be emphasized and photographically defined.

The light-reflecting frames are all readily disconnectible from one another for ease of transport.

I claim:

1. A light-reflecting device incorporating several light-reflecting frames is characterized in that a central light-reflecting frame (10) of polygonal shape is fitted with a cross bar (17) carrying at the centre a universal joint assembly (24) one element (21) of which is fixed to the cross bar (17) and the other relatively movable element (29) is formed for attachment to a supporting rod (25) and there are provided adjacent each end of the cross bar (17) a universal joint assembly (20) one element of which is fastened to the cross bar and the other relatively movable element (21) of which is attached to an edge of a respective outer light-reflecting frame (10) also of polygonal shape.

2. A light-reflecting device according to claim 1, characterized in that at least one of the light-reflecting frames (10) is of the shape of a trapezium.

3. A light-reflecting device according to claim 1, characterized in that at least one of the light-reflecting frames (10) is of the shape of a rhombus.

4. A light-reflecting device according to claim 1, characterized in that each universal joint assembly (20 or 24) is a ball and socket joint assembly.

5. A light-reflecting device according to claim 1, characterized in that means (26) is provided for locking each universal joint assembly in a chosen orientation.

6. A light-reflecting device according to claim 1, characterized in that the universal joint assembly at the centre of the cross bar presents a spigot insertable into a tubular supporting rod.

7. A light-reflecting device according to claim 1, characterized in that each frame is formed of tubular members jointed to one another at their ends to form a frame, the ends of each pair of adjacent frame members being jointed to one another by a connecting piece comprising a plug portion (15) fitting tightly into the end of one tubular member and a screw-threaded portion projecting from one end of the plug portion and passing diametrally through a hole provided in the other tubular member of the pair, a nut (16) engaged with the screw-threaded portion holding the two members to one another.

8. A light-reflecting device according to claim 1, characterized in that additional light-reflecting frames are arranged to be attachable to the side members of the outer light-reflecting frames (10).

9. A light-reflecting device according to claim 1, characterized in that the light-reflecting frames carry light-reflecting surfaces which are detachably attached to the frames.

* * * * *